Feb. 18, 1964     J. A. KLINGENSMITH ET AL     3,121,538
COIL WINDING APPARATUS

Filed Nov. 28, 1960     7 Sheets-Sheet 1

Fig. I.

WITNESSES

INVENTORS
Herbert W. Speight,
John A. Klingensmith &
Sydney L. Gale
BY
ATTORNEY

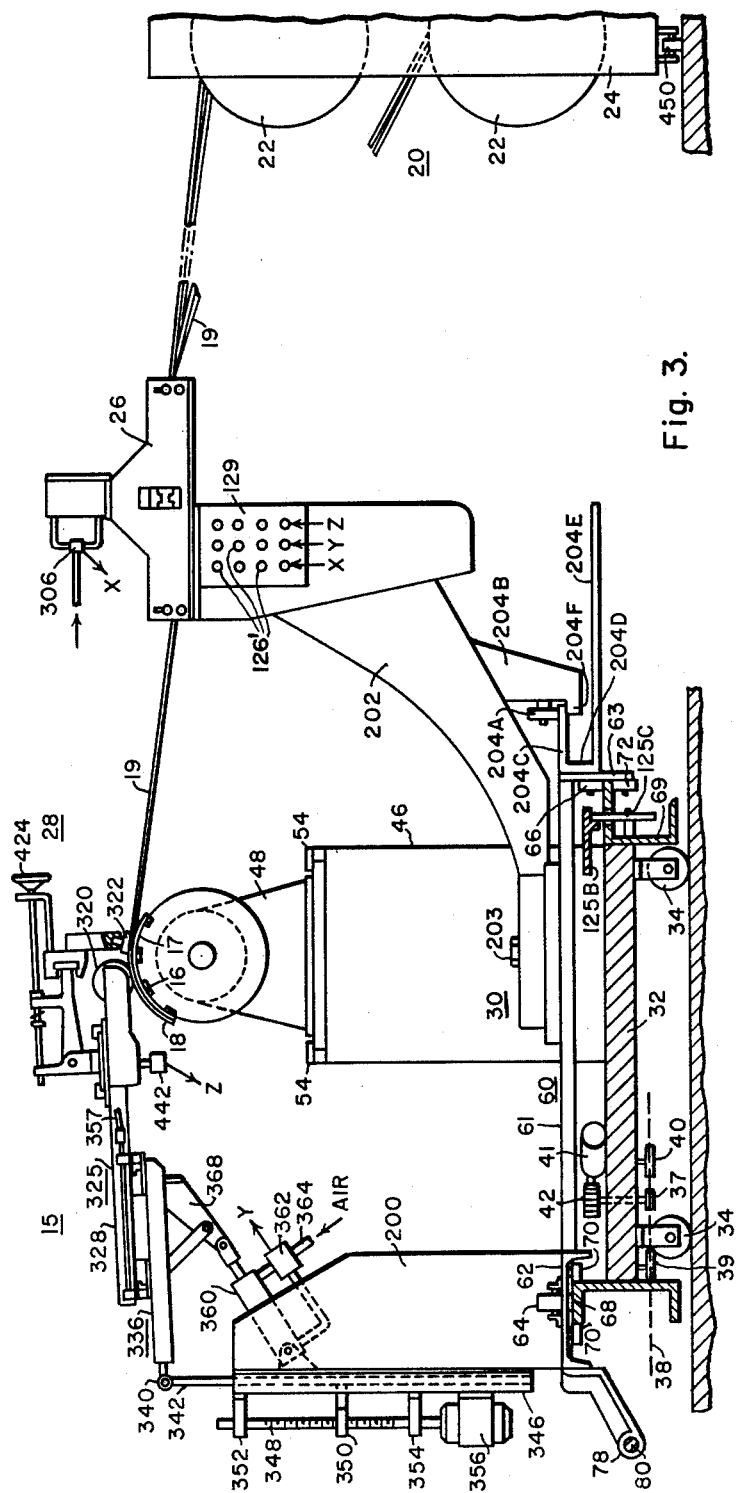

Feb. 18, 1964  J. A. KLINGENSMITH ET AL  3,121,538
COIL WINDING APPARATUS
Filed Nov. 28, 1960  7 Sheets-Sheet 4

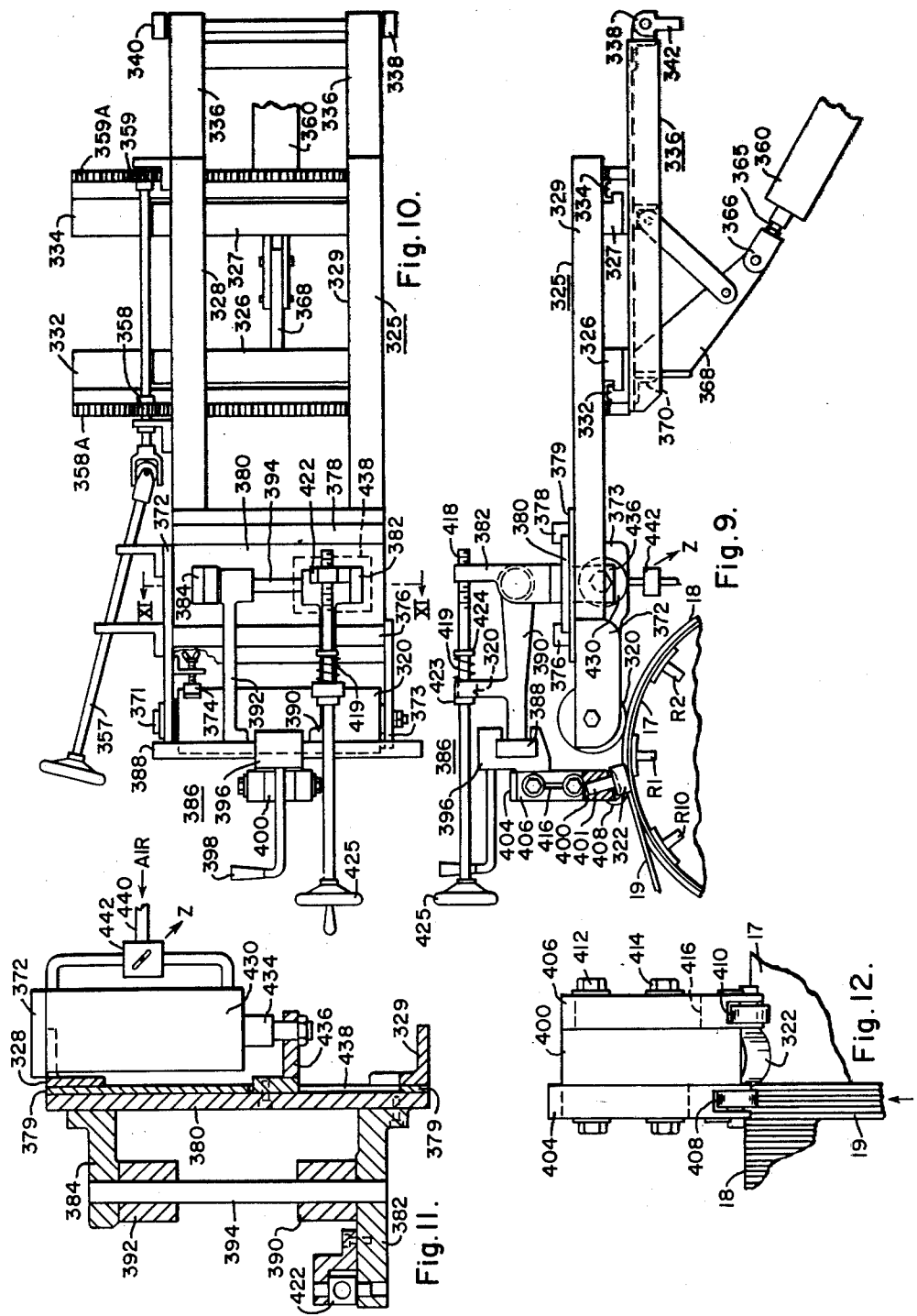

United States Patent Office 3,121,538
Patented Feb. 18, 1964

3,121,538
COIL WINDING APPARATUS
John A. Klingensmith, Muncie, Ind., Herbert W. Speight, Sharpsville, Pa., and Sydney L. Gale, Rochester, N.Y., assignors to Westinghouse Electric Corporation, East Pittsburgh, Pa., a corporation of Pennsylvania
Filed Nov. 28, 1960, Ser. No. 72,131
14 Claims. (Cl. 242—9)

This invention relates to coil winding apparatus and more particularly to apparatus for winding coils of relatively heavy wire on hollow tubes.

Previously known arrangements for winding large electrical transformer coils of heavy gauge wire on hollow forms, or tubes, involved such techniques and apparatus as: manually compacting the wire turns against each other and against the tube with a mallet while the coil is being wound; rope-anchored tension devices un-coordinated with the winding progression and incapable of providing uniform tension to a plurality of parallel strands being wound simultaneously; and built up wooden mandrels for supporting the hollow winding tube, which mandrels had to be disassembled piece by piece for coil removal. Generally, the wire was compacted by frequently stopping the revolving mandrel and applying mallet blows to undulating sections of the wire. Hammering on the wire applies localized forces on the wire resulting in excessive stresses in small confined areas of the wire which often adversely affect the characteristics of the wire and coil. Prior tensioning techniques involved manual "feel" and manipulation of tension blocks that are clamped around the wire and "tethered" to the floor by long ropes. Thus, prior winding practice on large coils was subject to human operator characteristics, such as strength, technique, mood and so forth which varied from one operator to another.

One phase of the present invention is directed to a novel apparatus wherein the above-mentioned coil compacting and tensioning operations are performed mechanically by apparatus elements mounted on a carriage which is coordinated with the mandrel drive to traverse the length of coil as the winding progresses. Other aspects of the invention include: a novel, radially adjustable mandrel having provision for tilt to, and removal along, an axis at an angle to the winding axis; a novel tensioning device employing mutually facing movable endless belts for receiving wire therebetween to apply a drag thereto; and a novel wire compacting arrangement with a head having forced elements engaging each wire turn as it is wound with further provision for retracting the head to allow the mandrel to swing out of its normal winding axis. The invention is especially suited for use in connection with rectangular cable having a plurality of parallel rectangular strands, and particularly where each strand is of the order of ¼ inch thick or greater.

It is therefore an object of the present invention to provide a novel arrangement for winding wire coils.

Another object is to provide novel apparatus for winding wire coils on hollow tubes.

Another object is to provide a novel arrangement for tensioning the wire being formed into a coil.

Another object contemplates tension apparatus providing uniform drag to each of a plurality of wire strands being simultaneously wound in a coil.

Another object is the provision of a novel apparatus for compacting the wire turns as they are being formed.

Another object is to provide such tension and compacting elements with traverse movement, axially of the coil being wound and at a rate proportional to the mandrel drive.

Yet another object of the invention is to provide in a winding apparatus a tension device in which drag is imparted to wire by passing it between juxtaposed movable endless belts biased toward each other.

A further object is to provide a novel coil winding apparatus with a radially adjustable mandrel.

A still further object is a mandrel having provision for uncoupling one end of the mandrel and swinging the mandrel about a pivot at its other end for convenient removal of the mandrel and coil.

Other objects of the invention will be apparent from the following description taken in conjunction with the accompanying drawings, in which:

FIGURE 3 is a section taken along line III—III of FIG. 1;

FIGURES 9 and 10 are respectively side elevation and plan views of the wire compacting device shown in FIGS. 1 and 3.

FIGURE 11 is a section taken along line XI—XI of FIG. 9;

FIGURE 12 is a front view of only the drifting roll head of the compacting assembly of FIG. 9.

Figure 1:
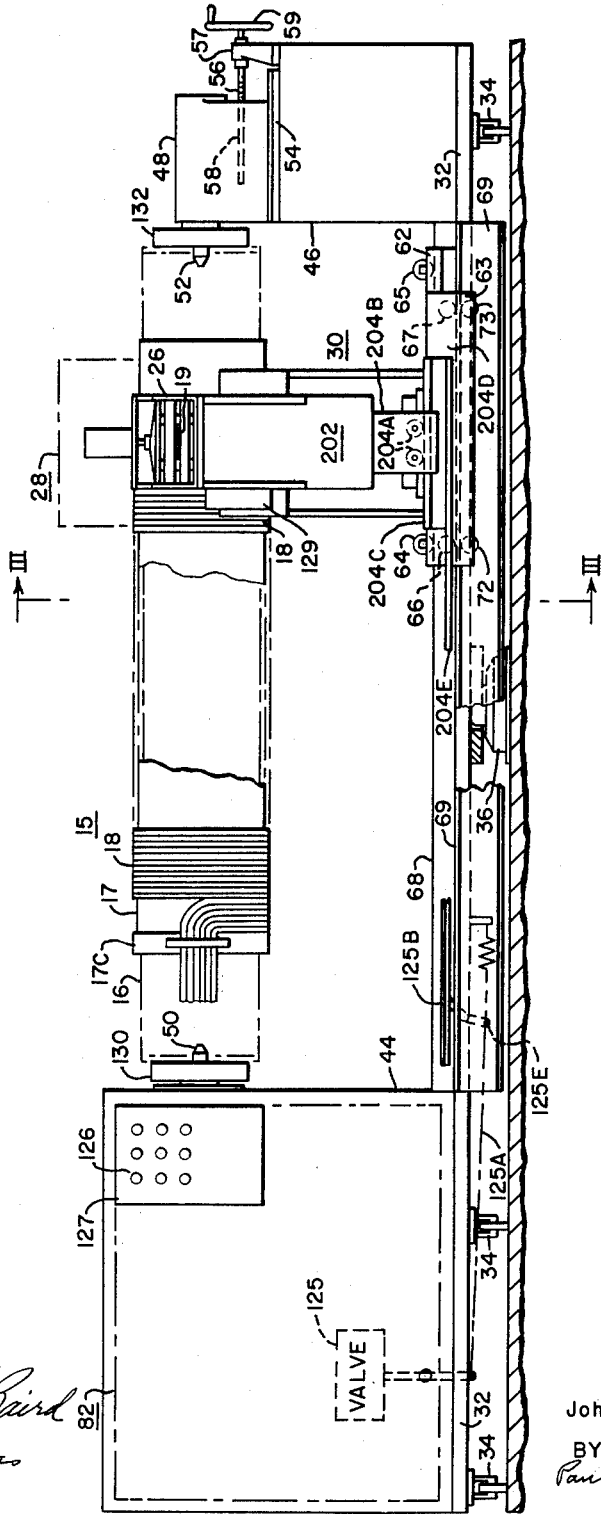
FIGURE 1 is a front elevation of a coil winding apparatus embodying features of the invention.
Figure 2:
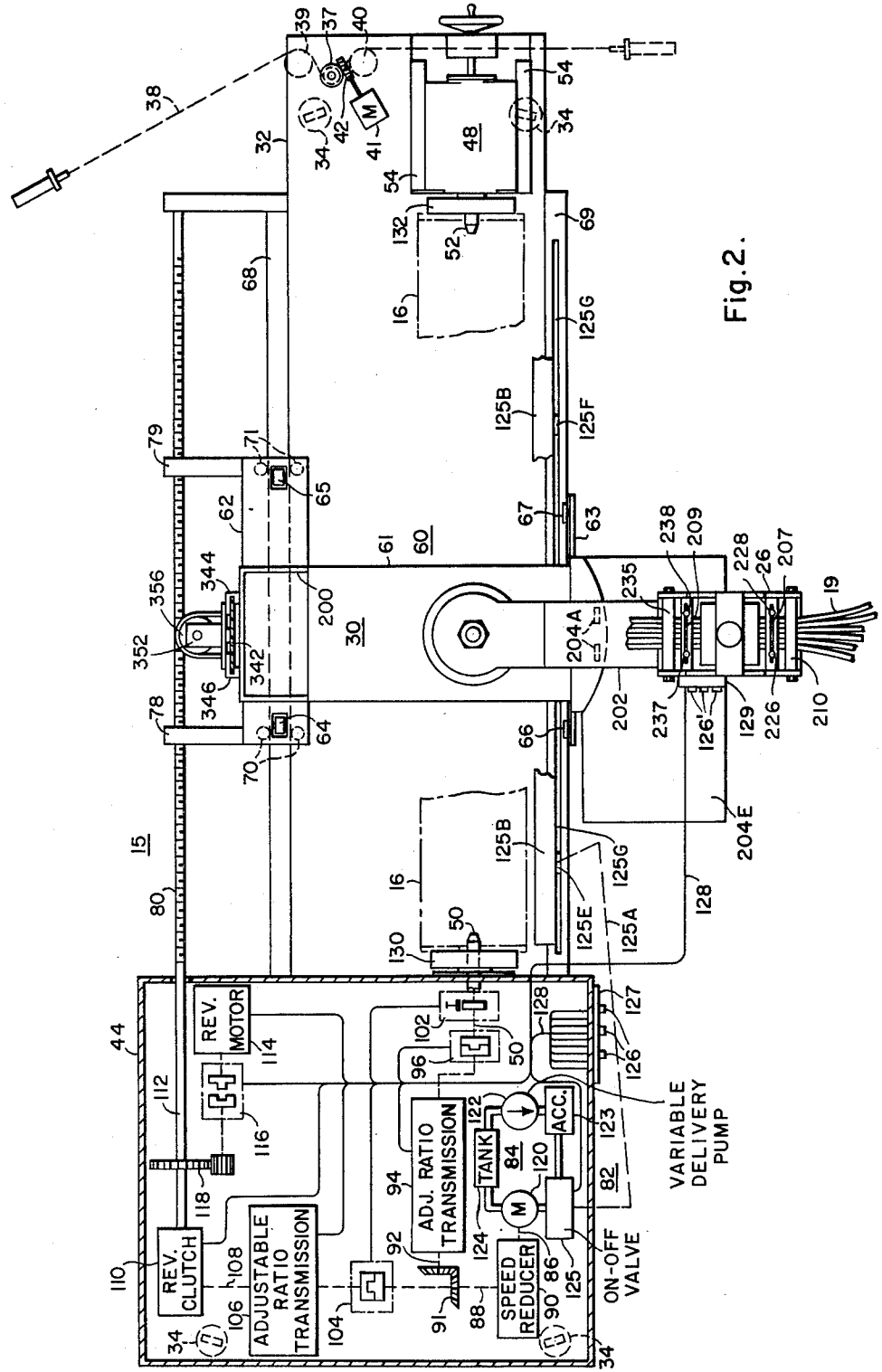
FIGURE 2 is a plan view of the apparatus of FIG. 1 with the compacting element removed. In this figure, the headstock is uncovered to show the related drives in diagrammatic form.

The coil winding apparatus of FIGS. 1, 2 and 3 includes a coil winding machine 15 with a rotatably driven and radially adjustable mandrel 16 which supports a hollow coil form or tube 17 on which the coil 18 is wound from a cable of a plurality of strands of insulated wire 19 supplied from a source 20 (FIG. 3) including reels 22 and a reel rack 24. The machine in FIG. 1 further includes a tensioning device 26 and a turn compacting device 28 respectively supported on opposite sides of a traverse carriage 30 movable axially with respect to the winding axis of the system and at a rate proportional to the rotational speed of the mandrel.

The above components of the coil winding machine 15 are supported on a base 32 carried on casters 34 and movable for positioning around a floor mounted pivot 36, which may also bear some of the downward thrust of the machine. Adjustment of the angular position of the machine around the pivot is provided by a sprocket wheel 37, which is rotatably mounted on the base and engages a sprocket chain 38 whose ends pass around pulleys 39 and 40 and are anchored to the floor. The sprocket wheel 37 may be driven by manual crank or by a suitable motor 41 through the worm and pinion gear train 42.

Extending vertically upward from opposite ends of the base 32 are a headstock 44 and a pedestal 46 for a tailstock 48. The headstock and tailstock respectively carry coaxial rotatable spindles 50 and 52, to which opposite ends of the mandrel 16 are coupled. Axial adjustment of the tail stock 48 which glides in ways 54 is provided by a lead screw 56 rotatably anchored in a post 57, and threaded into a threaded aperture 58 in the tailstock.

The free end of the screw terminates in a manually operable crank 59.

The carriage 30 has an I-shaped base frame 60 with a center portion 61 and cross-members 62 and 63. Carriage 30 is provided with wheels 64, 65, 66 and 67 through which the carriage rides on a pair of parallel rails 68 and 69. Lateral movement of the carriage is prevented by pairs of wheels 70 and 71 engaging the sides of track 68, while upward movement is prevented by wheels 72 and 73 engaging the underside of rail 69. Wheels 64, 65, 70 and 71 are rotatably mounted on cross-member 62 of the carriage frame 60, while wheels 66, 67, 72 and 73 are mounted on the other cross-member 63 of the carriage frame. The carriage 30 is moved along the rails by means of threaded runners 78 and 79 fixed to the carriage frame cross piece 62 and threadedly engaged by a lead screw 80 driven in a manner later described. The lead screw while supported for rotation in bearings respectively carried by the headstock and tailstock, is axially restrained.

A drive network 82, shown diagrammatically in FIG. 2 is located within the hollow headstock 44, and provides correlated drives to lead screw 80 and the headstock spindle 50, with a predetermined carriage axial traverse ratio per spindle revolution depending on the particular winding assignment. The driving network 82 includes an adjustable speed drive 84 whose output shaft 86 is coupled to a shaft 88 through a speed reducer 90. Through bevel gears 91, shaft 88 drives a shaft 92 coupled to the input of an adjustable ratio transmission 94 whose output is coupled through a clutch 96 to the spindle 50. This spindle is provided with a brake 102.

Shaft 88 is further coupled through a clutch 104 to the input of an adjustable ratio transmission 106, whose output shaft 108 drives the lead screw 80 through a reversing clutch 110 and a shaft 112 connected to the output of the clutch. To provide high speed traverse of the carriage 30, a high speed reversible motor 114 is connectable through a clutch 116 and gears 118 to the lead screw drive shaft 112. In a particular example the components of the drive 82 were arranged to provide speeds for spindle 50 ranging from about 2 to 63 r.p.m., and carriage traverse ratios per one spindle revolution ranging from near zero to 12 inches.

The adjustable speed drive 84 may be of any suitable type, for example the hydraulic system shown which includes a motor 120, a pump 122, an accumulator 123, and a tank 124 connected in a closed system. Shaft 86 is the output of motor 120. It will be understood that pump 122 is driven by a suitable motor (not shown) and that the speed of motor 120 may be controlled in various ways, for example by employing a variable delivery pump at 122. Motor 120 may be stopped by closing an on-off valve 125.

This valve may be operated electrically from a later described control panel, or through mechanical linkage 125A coupled to a long foot pedal 125B hinged to rail 69 by arms 125E and 125F, which extend through a slot 125G in the top of rail 69. Depressing the foot pedal 125B, closes valve 125 to stop motor 120. On the other hand, release of this foot pedal, opens valve 125 to operate motor 120.

Although the various clutches, brakes, transmissions, valve, and reversible motor shown in the drive 82 may be mechanically controlled if desired, they are indicated as being remotely electrically controlled devices by the lines connecting the devices to suitable controllers 126 on a panel 127 mounted on the head stock 44. The various lines are shown as collectively represented by a line 128 which is also coupled to a panel 129 mounted on carriage 30 for duplicate control facilities. Controllers 126 and their duplicates 126' may be switches, rheostats, or any other electrical control instrument as may be required by the particular device to which the controller is applicable. It should be further understood that although not shown, suitable sources of electrical power to operate the controls of the various devices and to operate the various motors throughout the apparatus are included. In case the various components of the drive 82 are mechanically controlled the lines collectively represented by line 128 may be mechanical linkages, cables, etc.

Figure 6:
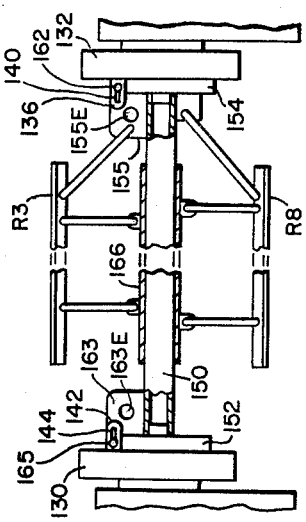
FIGURE 6 is a view partly in section showing the removable hinge arrangement at both ends of the mandrel. This view is confined to two other of the ten ribs.

Each of spindles 50 and 52 has keyed thereto a circular coupling plate through which the respective spindles extend as stub shafts. The coupling plate associated with spindle 50 is indicated at 130 while that associated with spindle 52 is indicated at 132. Plate 132 (FIGS. 5 and 6) has extending from the face thereof a pair of spaced tabs 134 and 136 having coincident oblong apertures 138 and 140. Plate 130 (FIG. 6) is similarly equipped with a pair of spaced tabs 142 and coincident oblong apertures 144. Only one of the apertured tabs on coupling plate 130 is visible in FIG. 6.

The mandrel 16 (FIGS. 4, 5 and 6) includes a hollow shaft 150 whose opposite ends terminate in centrally apertured flat-faced end caps 152 and 154, which respectively abut the face plates 130 and 132 when the mandrel is in operative winding position. In this position, spindles 50 and 52 extend through the central apertures of caps 152 and 154 into the respective ends of the hollow shaft 150. One end of shaft 150 has attached thereto a radially extending fin 155 having an apertured portion which fits between the tabs 134 and 136 with its aperture 156 normally aligned with those ends of apertures 138 and 140 that are nearest the roots of tabs 134 and 136 for the receipt of a removable hinge pin 162 which when inserted will extend through these coincident apertures. The other end of shaft 150 is likewise provided with a radially extending fin 163 having an apertured portion which fits between tabs 142 with its aperture normally aligned with those ends of apertures 144 that are nearest the face of plate 130 for the receipt of a removable hinge pin 165, which when inserted will extend through these apertures. Fins 155 and 163 have lifting eye holes 155E and 163E, respectively, for the receipt of a crane hook for lifting purposes. Winding torque is imparted to the mandrel shaft by the thrust applied by tabs 142 to the fin 163 in response to rotation of spindle 50.

Slidably fitted over the mandrel shaft 150 is a tube 166, forming with the shaft a concentric assembly to which are linked ten ribs R1–R10 parallel to each other and to the shaft 150 and uniformly peripherally spaced around the shaft. Each rib is linked to one of said shaft 150 and tube 166 by a first arm and to the other of said shaft and tube by a plurality of parallel axially spaced arms. The arrangement is such that the angle between said first arm and any one of said plurality of arms diverges as the arms are folded toward the shaft 150, and decreases as the arms are extended radially outward. This arrangement provides geometric rigidity to the structure when tube 166 is locked relative to shaft 150 in the manner later described. In the specific example shown, each rib is linked to the shaft 150 by an arm whose opposite ends are respectively pivoted to the rib and to the shaft. Also in the example shown, each rib is linked to the tube 166 by a plurality of parallel axially spaced arms whose opposite ends are respectively pivoted to the rib and the tube.

All the ribs and associated linkages are similar in construction and only one need be described in detail. Considering rib R5 as an example, it is T-shaped in cross section and is linked to shaft 150 by an arm 167. The ends of the arm are bifurcated and apertured for pivot pins. One end of arm 167 is pivoted to the web of rib 5 by a pin 168 while the other end is pivoted by a pin 169 to a radial tab 169A on shaft 150. Rib R5 is also linked to the tube 166 by parallel arms 170, 171, 172 and 173, each with apertured bifurcated ends. The latter arms are pivoted by pins 174, 175, 176 and 177, respectively, to the web of rib R5, and by pins 178, 179, 180 and 181, respectively, to radial tabs 182, 183, 184 and 185 on the tube 166. The structure of the bifurcated arms may be seen from those shown in FIG. 5.

In response to relative axial movement between the tube 166 and shaft 150, the ribs are moved radially inward or outward depending upon the direction of the relative displacement between the tube and the shaft. If the tube is moved to the left (FIG. 4) relative to the shaft, the ribs together with the arms will move radially inward and the mandrel will be contracted or collapsed. On the other hand, when the mandrel is in a contracted position, if the tube 166 is moved to the right relative to the shaft, the arms and ribs will move radially outward and the mandrel will be expanded.

Means for axially moving and locking the tube 168 in any one of a plurality of axially spaced positions along shaft 150 is provided by a lead screw 186 having a central portion 187 threaded through a runner 188 fixed to the tube 166. Integral shaft portions 189 and 190 at opposite ends of screw 186 are journalled for rotation in end caps 152 and 154, respectively. Thus, although rotatable the lead screw is restrained axially. The shaft portions of screw 186 pass through guide apertures provided in tabs 191, 192, 193 and 194 attached to the tube 166, these tabs also being pivot points for arms linked to the rib R10. The screw 186 is rotated by either of removable manual cranks 195 or 196 through either of bevel gear arrangements 197 or 198. In FIG. 1, coil tube 17 is tightly gripped internally by the expanded ribs of the mandrel. The radially outward biased engagement of the ribs with the tube 17 may be seen in FIGS. 3 and 9.

Figure 4:
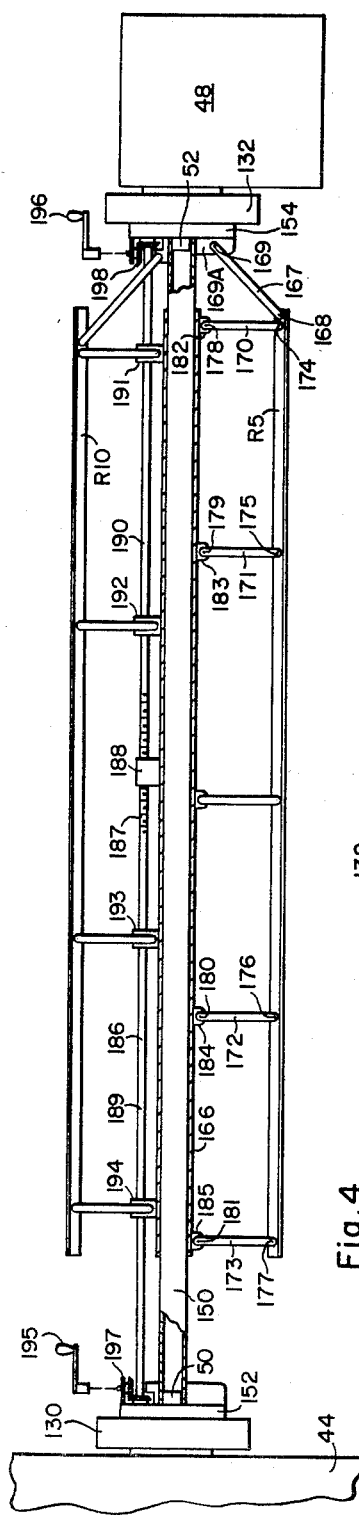
FIGURE 4 is a view, partly in section, of the adjustable mandrel, for clarity showing only two of the ten ribs.
Figure 5:
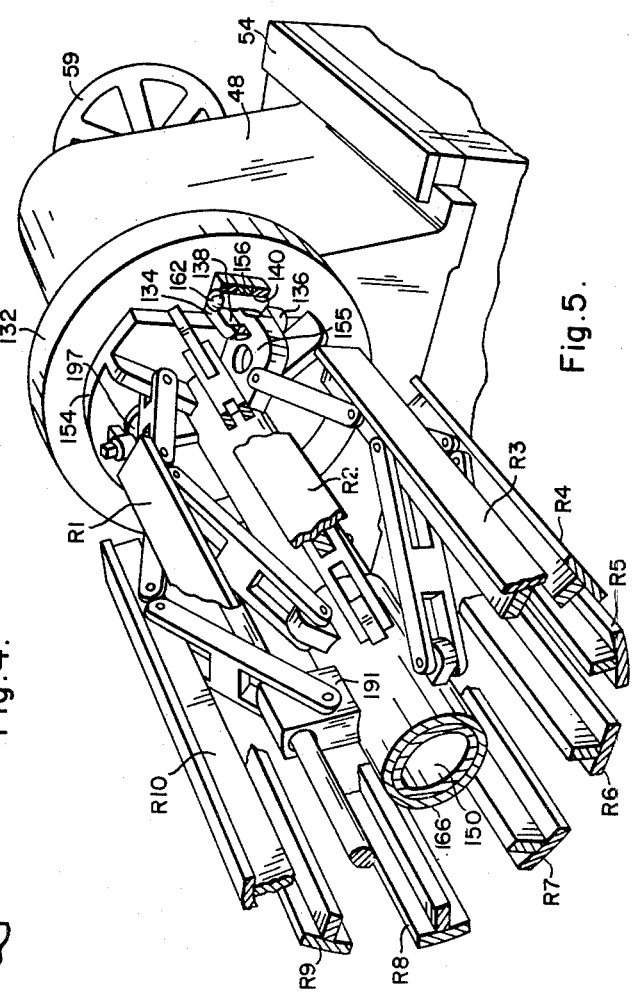
FIGURE 5 is a perspective view of one end of the mandrel, with parts broken away and some parts removed.

The mandrel is shown fully expanded in FIG. 4, and almost fully contracted in FIG. 5. The linkages between the ribs and the tube and shaft are so arranged that the angle between an arm linking the rib to a shaft and an arm linking the rib to the tube increases when the mandrel is contracted, and decreases when the mandrel is expanded. Thus, these arms have opposite slopes. For example, the slope of arm 167 is opposite to that of arm 171, and the angle between these arms increases when the mandrel is contracted and decreases when the mandrel is expanded. This provides a rigid geometry for any diameter of the mandrel. The pivots of the arms are along axes at right angles to the mandrel axis and the fit at all the pivot points of the arms is made close enough to provide sufficient rigidity for each rib in the peripheral direction of the mandrel.

Carriage 30 includes a pedestal 200 on which the compactor 28 is movably mounted. Carriage 30 also includes an azimuthally adjustable pedestal 202 on which tensioner 26 is mounted. The base of pedestal 202 is rotatable about a pivot bolt 203, which passes through the base of pedestal 202 and into the carriage base 61, to provide azimuthal adjustment, and is locked in any desired position by tightening the bolt. Other locking means, such as pins through matching apertures, may be employed if desired.

Part of the weight of the pedestal 202 rests on wheels 204A that are journaled in a bracket 204B attached to the pedestal, and which ride on a horizontal extension 204C of a member 204D fixed to the carriage frame 60. Member 204D also has a platform 204E on which a human operator may stand and ride with the movement of the carriage. A lip 204F on bracket 204B slidably engages the underside of extension 204C to take upward thrust components exerted on pedestal 202.

Figure 7:
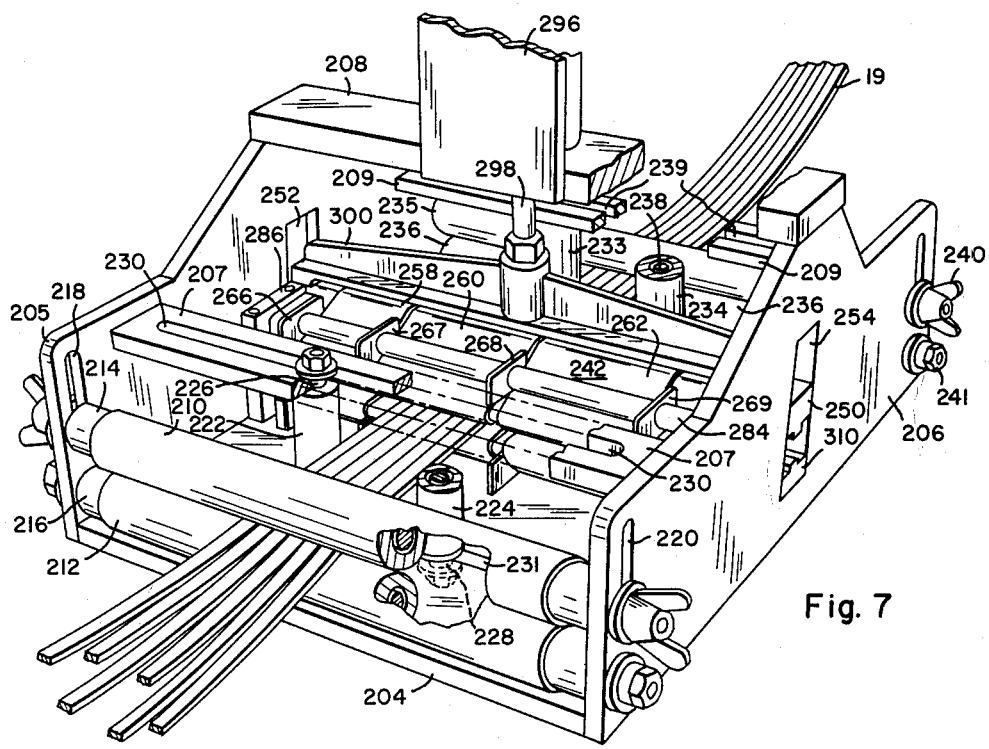
FIGURES 7 and 8 are perspective views of the tensioner and of a part of the tensioner.
Figure 8:
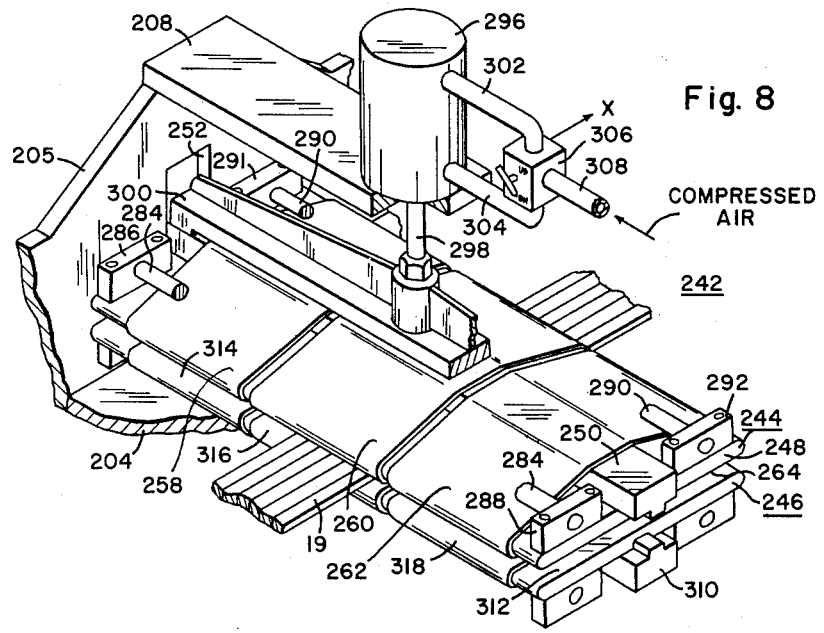

Secured to the top of the pedestal 202 is the frame of the tensioner 26, which frame includes a base 204 (FIGS. 7 and 8), vertical side members 205 and 206 and horizontal cross pieces 207, 208 and 209. The tensioner is equipped with a pair of vertically spaced horizontal input rolls 210 and 212 mounted for rotation on spindles 214 and 216 which extend through apertures in the side members 205 and 206 and are clamped in place by suitable nut and washer assemblies. The vertical height of spindle 214 and thereby the spacing between the rolls is made adjustable by mounting the spindle ends in slots 218 and 220 in members 205 and 206 respectively. Immediately behind the rolls 210 and 212 are a pair of vertical gathering rolls 222 and 224 spaced along the axes of rolls 210 and 212. Rolls 222 and 224 are identical and are similarly mounted for rotation around spindles 226 and 228 respectively which extend through a slot 230 in cross member 207 and a corresponding vertically spaced slot 231 directly below in the base plate 204. The ends of the spindles are suitably clamped by nut and washer members whereby the spacing between rollers 222 and 224 may be adjusted by loosening the nut fastenings of the spindles 226 and 228 and moving the spindles along slots 230 and 231 to the desired positions and then tightening the nuts to clamp the spindles in place. It should be understood that the nut assemblies at the ends of the various spindles serve only to secure the spindles in fixed positions and do not in any way impede the free rotation of the rolls around the spindles.

Sets of horizontal and vertical output rolls identical to the horizontal and vertical input rolls, are located at the output side of the tensioner. The vertical output rolls being indicated at 233 and 234 while the horizontal output rolls are indicated at 235 and 236. The order of the vertical and horizontal pairs of rolls on the output side of the machine is reversed with respect to that of the vertical and horizontal input rolls. That is, with respect to the flow direction of the wire through the tensioner, the horizontal output rolls follow the vertical output rolls. The vertical and horizontal output rolls are mounted for rotation in the same manner as the vertical and horizontal input rolls. Spindles 237 and 238 for the vertical output rolls 233 and 234 extend through a slot 239 in cross member 209 (FIGS. 2 and 7) and a corresponding slot (not visible) below it in the base 204. The ends of the spindles of the vertical and horizontal output rolls are provided with nuts and washers for clamping in the same manner as the input rolls. Spindles and nut fastenings for rolls 235 and 236 are shown at 240 and 241, respectively.

Disposed between the input and output vertical rolls is the drag mechanism 242 (FIGS. 7 and 8) which includes a pair of parallel, vertically spaced, horizontal shoes 244 and 246, each having a plurality of endless, movable belts spaced apart along the shoe. Shoe 244 includes a sole portion 248 secured to a backrib 250 whose ends extend beyond the sole 248 and are received in slots 252 and 254 respectively, in end plates 205 and 206 for the vertical guidance of shoe 244. The belts around this shoe are indicated at 258, 260 and 262 and are backed by the polished face 264 of the sole 248. Spacing and guidance of the belts is effected by two sets of plates on opposite sides of the back rib 250. The plates on one side of the rib are shown at 266, 267, 268 and 269 fixed to a rod 284 which in turn is secured to end blocks 286 and 288, respectively bolted to opposite ends of the shoe 244. The plates on the other side of rib 250 are identical but are not visible in FIG. 7. However, the rod which supports these plates and the end blocks which carry the rod are shown at 290, 291, and 292, respectively, in FIG. 8. In the latter figure, the showing of rods 284 and 290 is fragmentary, while the plates are not shown at all. Downward bias on shoe 244 is provided by the piston of an air cylinder 296 whose piston rod 298 is coupled to a yoke 300 secured to opposite ends of the back rib 250 of shoe 244. Air cylinder 296 is supported by the cross member 208 and is also provided with forward and reverse inputs 302 and 304 connectable through a forward-reverse valve 306 and a conduit 308 to a supply of compressed air (not shown). The valve 306 is not only directional, but also adjustable with respect to the amount of pressure in the selected direction.

Shoe 246 is in all respects similar to shoe 244 except that its position is reversed, and the opposite ends of its back rib 310 which extend through slots 254 and 252 are attached to end plates 206 and 205. Thus, shoe 246 is stationary with its sole face 312 confronting the face 264 of sole 248. Belts 258, 260 and 262 of shoe 244 are aligned with corresponding belts 314, 316 and 318 respectively of shoe 246. The belts may be of any suitable material, such as fabric, rubber, plastic and so forth. Fabric woven of nylon gave excellent results.

In operation of the tensioner 26, the wire bundle, which is constrained in proper width and height by the input and output vertical and horizontal rolls, passes between the belt-faced shoes 244 and 246, where drag is applied to the wire strands by frictional engagement with the mutually facing endless belts as a result of compression between the shoes due to the pressure loading of the upper shoe 244 by the air cylinder 296. The vertical and horizontal input and output rolls promote the free flow of the cable through the tensioner. The movability of the belts provides a smooth drag and prevents avulsion of the insulation on the wire.

The compacting device 28 (FIGS. 3, 9 and 10) includes vertical compacting means in the form of a pressure roll 320 whose function is to iron down the wire turn as it is being wound on the coil, and a horizontal compacting means in the form of a follower roll 322 which presses the coil wires tightly against the lead collar or the previous turns during the winding operation. These components are carried by an assembly 324 including a frame 325 having horizontal cross slides 326 and 327 secured to parallel horizontally spaced rails 328 and 329. Slides 326 and 327 engage slide ways 332 and 334, respectively, on a frame 336 hinged at 338 and 340 to a slide 342 retained on the rear vertical wall of the pedestal 200 by slide ways 344 and 346 (FIG. 2). Hinges 338 and 340 are along a horizontal axis thus permitting adjustment of the frame 336 in a vertical plane. Slide 342 is also adjustable vertically up or down by means of a motor operated lead screw 348 (FIG. 3) which engages a follower nut 350 fixed to the slide 342. The lead screw bearings 352 and 354, and the associated motor 356 are attached to the pedestal 200. Horizontal adjustment of the frame 325 is provided by rack and pinion arrangements operated by a hand wheel 357, which turns the pinion gears 358 and 359. The latter gears engage racks 358A and 359A attached to the frame 336.

Frame 336 is pivotable around hinges 338 and 340 by a double-acting air cylinder 360, which is controlled by a two-way valve 362 that selectively connects either end of the air cylinder to a compressed air supply line 364. The valve also adjusts the pressure for the selected direction.

The connecting rod 365 attached to the piston of air cylinder 360 is coupled through a hinged clevis 366 to a bracket 368 attached to a cross-member 370 of the frame 336. The lower end of cylinder 360 is hinged to the pedestal 200 to allow angular rotation in elevation. Supplying air to the upper end of the cylinder 360 will lower the frame 336. Conversely, supplying air to the lower end of the cylinder will raise the frame.

The pressure roll 320 is rotatably mounted on the forward end of frame 325 for rotation around a horizontal axis parallel to the winding axis of the mandrel. Roll 320 rotates about a spindle 371 carried by side plates 372 and 373. In operative position the pressure roll 320 engages the wire cable consisting of a single strand or a bundle of strands as the case may be and irons it down with radially inward pressure as the wire is being wound on the coil. The pressure exerted by the roll on the coil is controlled by regulating the air pressure to the air cylinder to provide any desired degree of downward pull on the frame 336.

The pressure roll may be locked by a manually operated brake 374 thereby to hold in place that part of the coil already wound, in case it is desired to operate the tensioner in a manner to relieve the tension on the wire for any desired purpose such as making an adjustment.

Constrained within a slide way formed by guide members 376 and 378 secured to the top of a plate 379 attached to frame 325 is a slide 380 having spaced uprights 382 and 384 to which is hinged a follower frame 386. Frame 386 includes a cross bar 388 attached to two spaced arms 390 and 392 whose free ends are mounted for rotation around a horizontal spindle 394 secured between the uprights 382 and 384. The cross bar 388 forms a horizontal slide way for a slider 396 which may be clamped in any desired position along the cross bar 388 by means of a manually operated locking bolt 398. Slider 396 has a depending head portion 400 the lower end of which carries a substantially vertical spindle 401 around which the follower roll 322 is mounted for rotation in a plane parallel to the axis of the mandrel. In operative position the periphery of the follower roll engages the side of the wire as it is being wound to press the wire against the lead collar or last-previous turn, as the case may be.

Attached to the member 400 are vertically adjustable legs 404 and 406 having notched lower ends in which are journaled a pair of wheels 408 and 410 for maintaining the follower roll 322 just above the surface of the core form 14. Leg 406 is attached to the member 400 by bolts 412 and 414 passing through an elongated slot 416 in the leg which allows vertical adjustment of the leg when bolts 412 and 414 are loosened. Leg 404 is adjustably secured to member 400 in the same manner. The follower head 400 is adjusted in elevation independently of the pressure roll 320 by a screw 418, loaded with a spring 419 and journaled in a slot 420 in an upwardly extending portion of arm 390. The end of screw 418 is threaded through a pivoted nut 422 carried by upright 382. The shank of screw 418 is provided with fixed collars 423 and 424, and a hand wheel 425.

Located underneath slide 380 and attached to side plate 372 is an air cylinder 430 whose piston is coupled to slide 380 through piston rod 434 and a bracket 436 extending through a slot 438 in plate 379 and bolted to the bottom of slide 380. Opposite ends of cylinder 430 are alternatively connectable to a compressed air supply hose 440 through a two way valve 442 which also permits adjustment of the degree of pressure in the desired direction. The stroke of the cylinder's piston is parallel to the slide ways 376 and 378 and the winding axis of the machine. Application of air pressure to one end of the cylinder forces slide 380 in one direction along its associated slide ways. Conversely the slide is forced in the opposite direction in response to air supplied to the other end of the cylinder.

Valves 306, 362 and 442 (FIGS. 3, 8, 9 and 11), may be electrically operated valves in which case the respective lines X, Y and Z leading from these valves, represent the requisite electrical control lines. These lines are shown connected to controls on the control panel 129 (FIG. 3).

In operation, one of wheels 408 and 410 is offset with respect to the other, one wheel riding the coil form 17 while the other wheel rides on the coil turns 18. The wheels are arranged to provide clearance between the follower roll and the surface of the coil form and to align the spindle 401 of the follower roll to the desired position whereby the periphery of the roll engages the sides of the wire 19 to provide a thrust parallel to the mandrel axis. The amount of axial thrust exerted by the follower roll 322 against the side of the wire is dependent on the amount of air pressure supplied to cylinder 430. The axis of spindle 401 will be generally along a line that intercepts the cylindrical surface of the coil form 17, for example, along a line normal to the surface of the coil form, i.e., along a line normal to a tangential plane. The latter is a preferred position, especially in the case of rectangular wire. Since the pressure roll 320 rests on the coil 18, the downward bias of air cylinder 360 has only a limited downward effect on the head 400. However, in addition to the weight of the head and its supporting frame 386, a slight additional downward bias may be furnished by spring 419.

Operation of the apparatus as a whole will be considered in connection with the winding of a cylindrical coil from a plurality of strands of insulated rectangular wire gathered together and maintained by the apparatus in a flat rectangular cable or bundle in which the individual strands are disposed side by side.

Assume an initial situation wherein the mandrel 16 is "empty," but is operatively coupled to the headstock and tailstock spindles. In order to "load" the mandrel with a tube form 17, it is removed from the machine in the following manner.

First the compactor 28 is raised out of the way by supplying air pressure to the lower end of cylinder 360, thus to swing frame 336 upward so that the mandrel can be tilted vertically. The mandrel is turned until the radial fins 155 and 163 are centered on top. A crane hook is then inserted in the lifting eye hole at that end of the mandrel which is to be tilted upward. For example, if the right end of the mandrel is to be tilted upward, the crane hook is inserted in the lifting eye hole 155E. When the weight of the mandrel is taken up by the crane, the pin 162 is removed. The tailstock 48 is then retracted until hinge pin 165 reaches the ends of slots 144, and the stub shaft 52 is clear of the mandrel. Next, the mandrel is tilted upward by the crane until it is in a vertical position with the weight taken off hinge pin 165. This pin is then removed, and the mandrel is carried by the crane to a loading station, where it is set down vertically on a suitable support. While in this position, the diameter of the mandrel is adjusted to permit a cylindrical coil form or tube 17 with a lead collar 17c to be slipped over the mandrel, which is then expanded by turning the crank 195 in the proper direction until the ribs of the mandrel grip the coil form internally by the exertion of radially outward forces. The "loaded" mandrel is transported to the machine and coupled to the headstock and tailstock spindles by reversing the steps above outlined in connection with the removal of the mandrel from the apparatus. It should be noted that during the winding operation, spindles 50 and 52 extend into the hollow shaft 150 up to their "hilts" (coupling plates 130 and 132). Thus the hinge pins at the ends of the mandrel are only necessary when the tail stock is to be retracted for tilting and removing the mandrel.

In the illustrated example, six strands of rectangular wire, supplied from six reels (only two reels visible in FIG. 3) rotatably mounted on rack 24, are passed through the tensioner 26, where the spacings between the rolls of each set have been properly adjusted to gather together the individual strands and maintain them in a flat rectangular cable whose end is clamped to the lead collar 17c at the left end of the coil form 17 to provide a start for the coil. The mandrel is then driven through a small angle and stopped while frame 336 is lowered by proper application of air to cylinder 360, and the height of compactor 28 is adjusted by operating motor 356 to move slide 342 to the proper height where the pressure roll 320 rides the top of the flat cable 19 on the coil form. Next the periphery of the follower roll 322 is moved into engagement with the side of the cable 19 by adjusting the horizontal placement (axial of the mandrel) of frame 325 and the vertical position of head 400. The horizontal adjustment is effected by operating handle 357 while the vertical adjustment is made by operating hand wheel 425.

Sufficient air pressure is supplied to cylinder 360 to apply enough downward bias on the pressure roll 320 in order to iron down undulations of the cable 19 which are normal to the peripheral winding surface of the tube 14. Air is supplied to the proper end of cylinder 430, and under sufficient pressure to bias the follower roll 322, in order to provide sufficient axial thrust of the roll against the sides of the wire cable 19 to smooth out lateral undulations of the wire, thus to compact the wire against the last previous turn or the lead collar 17c, as the case may be.

Tensioner 26 imparts sufficient tension to each of the strands of cable 19 to maintain the compact flat rectangular form of the cable, to aid in removing undulations from the individual strands of wire and of the cable itself, and to tightly lay the cable against the coil form 14 during the winding operation. Proper tensioning is provided by supplying sufficient air to the upper end of the cylinder 296 to effect the desired result.

The winding operation is resumed by operating the necessary controls to start the spindle drive. As the mandrel rotates to wind the coil the carriage 30 moves in the direction of winding progression at a rate of speed having a predetermined relation to the mandrel speed to maintain the compactor 28 and the tensioner 26 in proper position at all times during the winding progression. Although pedestal 202 is adjustable around pivot bolt 203 to provide the desired feed or helical lead angle between tensioner 26 and the mandrel, the coordination between the mandrel drive and the carriage traverse provides the required feed or lead angle to the wire 19 for most situations.

Reel rack 24 is shown mounted on wheels 450 to permit the operator to move the rack axially of the coil as the winding progresses, if it is so desired.

While the apparatus has been illustrated in connection with a rectangular cable having a plurality of strands disposed side by side and one layer high, the invention is equally adaptable to winding coils from rectangular cable having a plurality of layers each having a plurality of side by side strands of wire.

Figure 13:
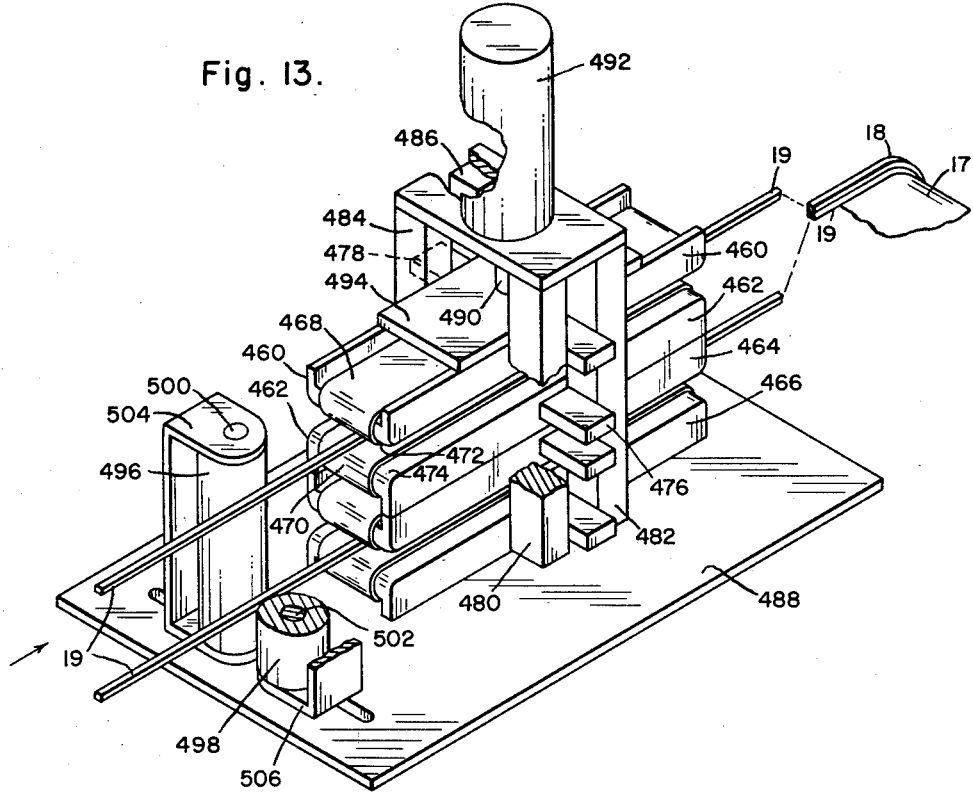
FIGURE 13 is a view of an alternative form of the tensioner.

In the case where the cable and each coil turn is two strands or more high, the tensioner 26 mounted on pedestal 202, may take the form illustrated in FIG. 13, wherein a "two-high" tensioner is shown by way of example. This alternative form includes two pairs of shoes, one for each level of the cable 19, which is shown in this figure as two strands high and one strand wide (rectangular strands), although the tensioner is not restricted to one strand width. A pair of shoes 460 and 462 accommodates the upper strand of the cable, while the lower strand is served by a pair of shoes 464 and 466. Each shoe has therearound an endless movable belt and a polished sole face backing up the belt, the belt-covered sole faces of each pair confronting each other. For example shoes 460 and 462 have therearound belts 468 and 470, respectively, and mutually facing sole faces 472 and 474. Each shoe has a channeled back to allow free movement of the belt when the shoe is backed up against anything, for example, although shoes 462 and 464 are back to back, their channeled backs prevent binding of the belts. All the shoes have guide tabs 476 and 478 on opposite sides thereof which are received between guide posts 480 and 482, on one side, and 484 and 486, on the other side, all the posts being secured to a base 488. To impart drag to the wire strands between the shoes, the latter are forced toward each other by the piston rod 490 of an air cylinder 492 acting through a yoke 494 across the back of the top shoe 460.

Guidance for the wire passing through the shoes is provided by a pair of parallel rotatable guide rolls 496 and 498 spaced to snugly receive and guide the wire strands.

These rolls are mounted for rotation on spindles 500 and 502, carried by brackets 504 and 506, adjustably secured to the base of the tensioner. Spacing between the rolls is adjusted by adjusting the spacing between the brackets. Although the alternative form of tensioner in FIG. 13 has only two pairs of shoes in the shoe stack, it will be appreciated that more than two pairs of shoes may be stacked to accommodate a cable having more than two levels or layers of strands.

We claim as our invention:

1. In an apparatus for winding a coil around a form with wire from a supply source, a generally horizontal rotatable mandrel for holding said form during the winding operation, means for rotating said mandrel around the winding axis, a carriage, turn compacting means mounted on said carriage and extending over said mandrel, means coordinated with the rotation of said mandrel for moving said carriage along said mandrel, thereby to cause said turn compacting means to engage each new turn of wire as it is laid, means at one end of the mandrel for pivoting the mandrel around a second axis crosswise of said winding axis, and means for retracting said compacting means out of the way of said mandrel, whereby said mandrel may be swung upward around said second axis.

2. Apparatus for winding a coil around a hollow form with wire from a supply source, said apparatus comprising a rotatable mandrel for holding said form during the winding operation, first means for rotating said mandrel around a winding axis, a carriage, second means mounted on said carriage for performing work on the wire being wound into a coil, third means coordinated with the rotation of said mandrel for progressively moving the carriage along the mandrel in the direction of the turns accretion, a platform for carrying a human operator attached to said carriage for movement therewith, and a control element on said carriage for manipulation by a human operator riding on said platform, said control element being coupled to one of said first, second and third means for the control thereof.

3. In an apparatus for winding a coil around a form with wire from a supply source, a rotatable mandrel for holding said form during the winding operation, means for rotating said mandrel around the winding axis, said means comprising a pair of coaxial rotatable members axially spaced apart to accommodate the mandrel therebetween and coaxial therewith for rotation about a generally horizontal axis, disengageable means for coupling one end of the mandrel to one of said members, the other member having a shaft end extending toward said one member, the other end of the mandrel having a central tubular passage for receiving said shaft end, and a disengageable hinge linkage for coupling said other end of the mandrel to said other member, said linkage having a hinge axis cross-wise of and spaced radially from said shaft end, whereby said mandrel when disengaged at its one end may be swung upward around said hinge axis, a carriage, turn compacting means mounted on said carriage, means coordinated with the rotation of said mandrel for moving said carriage along said mandrel, thereby to cause said compacting means to engage each new turn of wire as it is laid, the operating position of said compacting means being over said mandrel, and means for retracting said compacting means from over said mandrel, thereby permitting said mandrel to be swung upward around said hinge axis.

4. The combination of claim 3 wherein said mandrel has adjustable means for changing its circumference.

5. Apparatus for winding an electrical coil around a form with a flat-sided multi-strand cable formed of a plurality of strands of wire from a supply source of individual wire strands, said apparatus comprising a plurality of supply reels, each for supplying one strand of said cable, a rotatable mandrel for holding said form during the winding operation, means for rotating said mandrel around the winding axis, a movable carriage, means coordinated with the rotation of the mandrel for moving said carriage along said winding axis in the direction of the turns accretion, guide means supported by said carriage for forming and maintaining said wire strands into a flat-sided cable to be wound on said form, said cable having a plurality of parallel strands disposed in side-by-side order across a flat side of the cable, and turns compacting means carried by said carriage for simultaneously engaging a plurality of strands along a flat side of each turn of said cable as it is laid on the form.

6. The combination as in claim 5, wherein the turn compacting means is a rotatable pressure roll for simultaneously engaging all the strands disposed along said flat side of the cable.

7. The combination of claim 5 wherein said guide means comprises a first pair of spaced parallel rollers and a second pair of spaced parallel rollers, the axes of said pairs of rollers being crosswise of each other, both said axes being crosswise of the line of travel of said wire strands toward the form on the mandrel, each pair of rolls being disposed to receive said strands of wire in the space between the rolls of the pair, whereby the strands are formed and maintained in a flat-sided cable.

8. Apparatus for winding a coil around a form with a flat-sided multi-strand cable formed of a plurality of strands of wire from a supply source of individual wire strands, said apparatus comprising a rotatable mandrel for holding said form during the winding operation, means for rotating said mandrel around the winding axis, a movable carriage, means coordinated with the rotation of the mandrel for moving said carriage along said winding axis in the direction of the turns accretion, wire tensioning means supported by said carriage and positioned to intercept and apply tension simultaneously to all the wire strands on their way from the supply source to the form on the mandrel, and guide means carried by said carriage for forming and maintaining said wire strands in a flat-sided cable to be wound on the form, said cable having a plurality of parallel strands disposed in consecutive order across a flat side of the cable.

9. The combination as in claim 8 further including a plurality of supply reels, each for supplying one strand of said cable.

10. The combination of claim 8 wherein said guide means comprises a first pair of spaced parallel rollers and a second pair of spaced parallel rollers, the axes of said pairs of rollers being crosswise of each other, both said axes being crosswise of the line of travel of said wire strands toward the form on the mandrel, each pair of rollers being disposed to receive said strands of wire in the space between the rolls of the pair, whereby the strands are formed and maintained in a flat-sided cable.

11. Apparatus for winding a coil around a form with a flat-sided multi-strand cable formed of a plurality of strands of wire from a supply source of individual wire strands, said apparatus comprising a rotatable mandrel for holding said form during the winding operation, means for rotating said mandrel around the winding axis, a movable carriage, means coordinated with the rotation of the mandrel for moving said carriage along said winding axis in the direction of the turns accretion, wire tensioning means supported by said carriage and positioned on one side of the mandrel to intercept and apply tension simultaneously to all the wire strands on their way from the supply source to the form on the mandrel, guide means carried by said carriage for forming and maintaining said wire strands in a flat-sided cable with a plurality of parallel strands disposed in consecutive order across a flat side of the cable, turn compacting means supported by said carriage for simultaneously engaging a plurality of strands along a flat side of each turn of cable as it is laid on the form, said tension and guide means being supported by said carriage on one side of said mandrel, and said compacting means being supported by said carriage on the opposite side of said mandrel.

12. The combination of claim 11 further including a multi-reel supply source having a separate reel for supplying each strand of said cable.

13. The combination as in claim 11 wherein said mandrel is swingable around a second axis crosswise of said winding axis, and said compacting means is retractable out of the way of said mandrel, whereby the mandrel may be swung outward around said second axis.

14. The combination of claim 11 wherein said guide means comprises a first pair of spaced parallel rollers and a second pair of spaced parallel rollers, the axes of said pairs of rollers being crosswise of each other, both said axes being crosswise of the line of travel of said wire strands toward the form on the mandrel, each pair of rolls being disposed to receive said strands of wire in the space between the rolls of the pair, whereby the strands are formed and maintained in a flat-sided cable.

References Cited in the file of this patent

UNITED STATES PATENTS

| | | |
|---|---|---|
| 249,525 | Howard | Nov. 15, 1881 |
| 271,165 | Vaughn | Jan. 23, 1883 |
| 359,205 | Curtis et al. | Mar. 8, 1887 |
| 442,309 | Diamond et al. | Dec. 9, 1890 |
| 860,720 | Adams | July 23, 1907 |
| 2,296,662 | Greenaway | Sept. 22, 1942 |
| 2,426,631 | Mapes | Sept. 2, 1947 |
| 2,442,946 | Barton | June 8, 1948 |
| 2,649,251 | Nordell | Aug. 18, 1953 |
| 2,686,487 | Carr | Aug. 17, 1954 |
| 2,762,577 | Herr | Sept. 11, 1956 |
| 2,956,755 | Ottenheimer et al. | Oct. 18, 1960 |
| 2,998,207 | Moore | Aug. 29, 1961 |

FOREIGN PATENTS

| | | |
|---|---|---|
| 796,091 | France | Jan. 17, 1936 |
| 724,708 | Germany | Oct. 16, 1943 |